Nov. 30, 1965  TOMIO YAZAWA  3,221,221
POINT CONTACT DETECTOR
Filed May 14, 1962
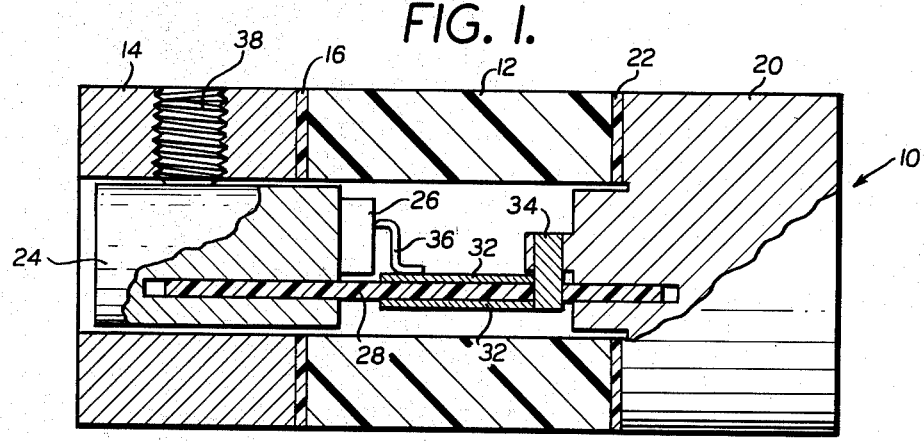
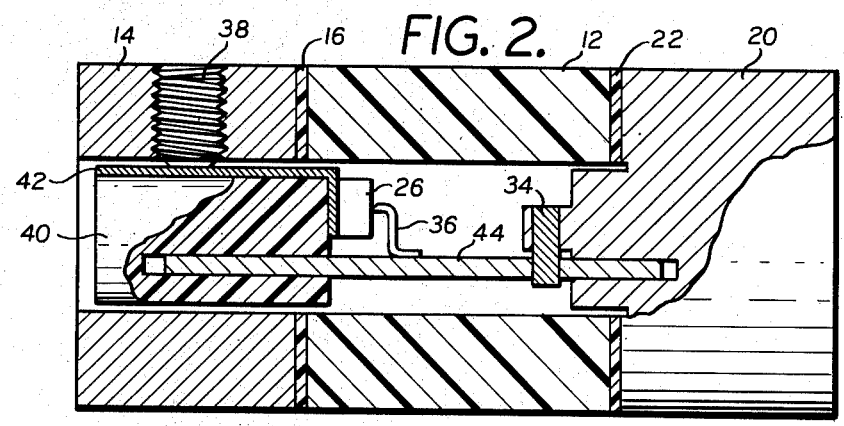
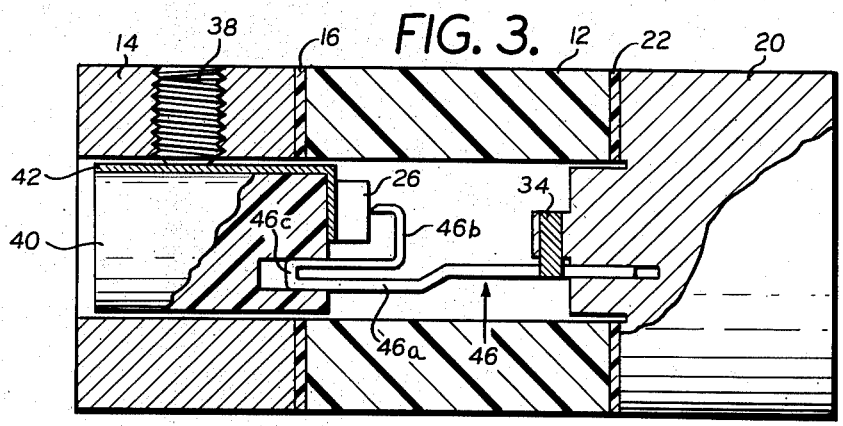
INVENTOR
TOMIO YAZAWA
BY
*Hopgood & Calimafde*
ATTORNEYS.

United States Patent Office 3,221,221
Patented Nov. 30, 1965

3,221,221
POINT CONTACT DETECTOR
Tomio Yazawa, Tokyo, Japan, assignor to Nippon Electric Company Limited, Tokyo, Japan, a corporation of Japan
Filed May 14, 1962, Ser. No. 194,438
Claims priority, application Japan, May 31, 1961, 36/27,827
5 Claims. (Cl. 317—236)

This invention relates to means for detecting electrical signals and particularly to a detector which employs a rectifying or detecting element such as a semiconductor.

Point contact detectors of the prior art generally comprise a pair of electrodes disposed in spaced relationship with respect to each other, one electrode having a semiconductor element and the other electrode having a probe, and are rendered operable by engaging the point of the probe with the semiconductor element. Probes of various shapes, such as for example S-shape, have been found suitable for various reasons, however it has also been found that these probes are generally susceptible to shock so that under such a condition the probe is shifted with respect to the surface of the semiconductor element.

In at least one prior art patent, namely United States Patent 2,825,015, there is disclosed an improved construction which represents a solution to this particular problem. This is achieved by bonding the probe at a point intermediate its ends, to the surface of the semiconductor element, so that improved stability and resistance to shock are achieved. However, in the assembly, due to the fact that the whisker is fixed by cement to the surface of the semiconductor element, it sometimes happens that the cement flows into the point contact area before it is hardened, or that it accidentally comes into contact with other parts of the assembly, thereby impairing the characteristics of the device. A further disadvantage resides in the fact that a rather high degree of care and skill are required in the use of such cement during assembly, due to the minute nature of the parts and the extremely small spaces existing between them.

Accordingly it is an object of this invention to provide a point contact detector of the type described which has a high resistance to shock and which is assembled without the aid of cement or other binding materials in close proximity to the probe.

It is a further object of this invention to provide a point contact detector construction which is easier to assemble and simpler to fabricate than similar devices of the prior art.

A still further object is to provide a point contact detector having uniform and stable characteristics by assembling a portion of the unit after making the necessary setting of the probe with respect to the semiconductor material.

Other objects and advantages of the invention will be apparent to those skilled in the art from the following description taken in conjunction with the claims and the drawing in which:

FIG. 1 illustrates a sectional view of one embodiment of a detector constructed in accordance with the principles of this invention, and FIGS. 2 and 3 represent alternative embodiments of the invention.

Referring now to FIG. 1, the numeral 10 indicates generally a point contactor assembly having a cylinder 12 made of an insulating material, such as glass or ceramic, which encloses various parts which make up the assembly. A ring electrode 14 having substantially equal inside and outside diameters to those of the cylinder 12 is provided at one end of the assembly 10 and is rigidly secured by binding material 16 to one end of said cylinder. A cylindrical electrode 20 which has an outside diameter substantially equal to that of the cylinder 12 is provided at the other end of the assembly 10 and is rigidly secured by binding material 22 to the other end of the cylinder 12. A cylinder 24 of conductive material is provided within the internal space or aperture of the ring electrode 14 and may extend into the cylinder 12 as shown. A semiconductor element 26 is suitably secured to the inner end of the cylinder 24 by any conventional means such as soldering or a conductive cement. A hole is provided in the cylinder 24 and also in the electrode 20 for insertion of a probe support rod 28 of an insulating material, the support being held in these holes at its opposite ends.

A portion of the probe support rod 28 has a metal coating 32 and is electrically connected to the cylindrical electrode 20 through the medium of a conductive bar 34. A probe 36 of electrically conductive material and having suitable resilient characteristics is mounted on the probe support rod 28 in contact with the metal coating 32, this probe being in contact with the semiconductor element 26.

To assemble the unit, the ring electrode 14 and the cylindrical electrode 20 are first secured to opposite ends of the cylinder 12 by the binding material 16 and 22. One end of the metallized probe support rod 28 having the probe 36 affixed thereto is then inserted in the hole provided therefor in the electrode 14 until the free or pointed end of the probe 36 properly engages the surface of the semiconductor element 26 to the point where the probe is in a slightly biased condition. The cylinder 24 which carries the semiconductor element 26 and the probe assembly is then inserted into ring electrode 14, the right end of the supporting rod 28 engaging the hole provided in the electrode 20. The cylinder 24 is advanced until it is fully inside the hollow ring electrode 14. At this point the cylinder 24 is secured in position by means of a screw 38 in the ring electrode 14. A good electrical connection is made between the electrode 20 and the metal coating 32 on the probe support rod 28 by means of this coating engaging the conductive bar or member 34 which may be secured in any suitable manner to electrode 20.

FIGS. 2 and 3 illustrate alternative embodiments of the invention in which like numerals indicate like parts shown in FIG. 1. In FIG. 2 the cylinder 40 is modified from that described in FIG. 1 where it is described as a conductive cylinder. In FIG. 2 the cylinder 40 is made of an insulating material and is provided with a metal coating 42 which extends across the top of the cylinder 40 and also across a portion of its right end. The semiconductor element 26 is secured to the portion of the metal coating on the right end of this cylinder. Additionally the probe support rod 44 which is described as being made of an insulating material in FIG. 1 is made of a conductive material in FIG. 2 and the probe 36 is directly connected or secured to this rod. The remaining portion of the FIG. 2 construction is essentially the same as that shown in FIG. 1. The manner of assembly of the FIG. 2 construction requires no amplification over that described with regard to the construction of FIG. 1.

In the embodiment shown in FIG. 3 the probe and probe support rod have been modified over that shown in FIGS. 1 and 2. In FIG. 3 the probe and its support rod comprises a single conductive member 46 including the probe support portion 46a and the probe portion 46b. This integral member 46 is made by bending the piece or otherwise forming it so as to produce the bend 46c. To assemble the construction of FIG. 3, the end 46c of the member 46 is inserted into the hole provided therefor in the cylinder 40 until the probe 46b is properly engaged with the semiconductor element 26, the remainder of the assembly operation being similar to that described with respect to FIG. 1 above.

The various constructions described above result in a superior unit capable of withstanding much higher shock impact than similar devices known in the prior art. This is achieved by the novel construction described which features a relatively short length of probe material between the point of contact of the probe with the semiconductor material 26 and the point of support of the probe. This is in turn made possible by the particular design disclosed in which the probe support means is provided closely adjacent the semiconductor element so that the probe itself can be reduced to a relatively short length. For any given minimum diameter of probe material then, it will be appreciated that a smaller length to diameter ratio for the probe results over constructions of the prior art in which the probe support is located a greater distance from the semiconductor element. This means in effect that a probe of given material will have greater stiffness and will therefore provide greater mechanical stability and higher resistance to shock impact. The term diameter as applied to the cross-sectional area of the probe is not limited to a probe having a circular cross-section but is meant to apply to cross-sections of various configurations.

The invention described herein affords the additional advantage that the probe can be placed in its proper position into engagement with the surface of the semiconductor element outside the detector unit where sub-assembly of these parts can be more easily accomplished.

While the foregoing description sets forth the principles of the invention in connection with specific apparatus, it is to be understood that the description is made only by way of example and not as a limitation of the scope of the invention as set forth in the objects thereof and in the accompanying claims.

I claim:
1. A device for detecting electrical signals comprising first and second electrodes fixed in spaced relationship with respect to each other,
a semiconductor element secured in electrical contact with said first electrode,
a probe having a generally pointed end for engaging the surface of said element,
a support for said probe, said support being disposed closely adjacent said semiconductor element to thereby permit the use of a probe having a relatively small length to diameter ratio between said pointed end and the nearest point of support of said probe,
said support including a rod-like member having one end held in an aperture in said first electrode and whereby said probe is caused to engage said element with greater pressure as said member is inserted further into said aperture,
and means for providing an electrical path between said probe and said second electrode, said rod-like member including said electrical path means.

2. A device for detecting electrical signals comprising first and second electrodes fixed in spaced relationship with respect to each other, said first electrode including a ring-shaped member having a large aperture therein,
a support and a probe mounted on said support, said probe having a generally pointed end and a relatively small length to diameter ratio between said pointed end and the nearest point of support of said probe,
a semiconductor element and a mounting member in said aperture for supporting said element, the pointed end of said probe being in contact with a surface of said element,
said support including a rod-like member having one end held in an aperture in said mounting member and whereby said probe is caused to engage said element with greater pressure as said rod-like member is inserted further into said aperture in said mounting member,
means for providing an electrical path between said element and said ring-shaped member,
and said rod-like member including an electrical path between said probe and said second electrode.

3. The invention as recited in claim 2 which further includes screw means for rigidly holding said mounting member in said aperture of said first electrode.

4. The invention recited in claim 2 wherein said probe support and said probe comprise an integral unit formed from a single elongated conductive member, said member being mounted at one end in an aperture in said mounting member and at its other end on said second electrode.

5. A device for detecting electrical signals comprising first and second electrodes fixed in spaced relationship with respect to each other, said first electrode including a generally ring-shaped member having a relatively large aperture therein,
a support and a metallic probe mounted on said support, said probe having a generally pointed end and also having a relatively small length to diameter ratio between said pointed end and the nearest mounting point of said probe on said support,
a mounting member in said aperture of said ring-shaped member,
a semiconductor element fixed to said mounting member, the pointed end of said probe being in contact with a surface of said element,
said support including a rod-like member having an end slidably engageable in an aperture in said mounting member, whereby said probe may be caused to engage said semiconductor element in a readily controllable manner as a sub-assembly before the same is inserted through said aperture in said ring-shaped member,
electrical connection means connecting said element with said ring-shaped member,
said rod-like member including an electrical path between said probe and said second electrode,
and a housing between said electrodes for enclosing said element and said probe.

References Cited by the Examiner
UNITED STATES PATENTS

| | | | |
|---|---|---|---|
| 2,402,839 | 6/1946 | Ohl | 317—234 X |
| 2,560,606 | 7/1951 | Shive | 317—235 X |
| 2,740,940 | 4/1956 | Becker et al. | 317—235 X |
| 2,773,224 | 12/1956 | Lehovec | 317—235 |
| 2,825,015 | 2/1958 | Stineman et al. | 317—236 |
| 2,948,050 | 8/1960 | Van Vessem et al. | 317—236 X |

DAVID J. GALVIN, *Primary Examiner.*

JAMES D. KALLAM, *Examiner.*